(12) United States Patent
Dirkin et al.

(10) Patent No.: US 8,439,065 B2
(45) Date of Patent: May 14, 2013

(54) AUTOMOTIVE AIR BLEED VALVE FOR A CLOSED HYDRAULIC SYSTEM

(75) Inventors: William Dirkin, Gobles, MI (US); Franklin C. Lee, Irvine, CA (US); William Lui, Alhambra, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 233 days.

(21) Appl. No.: 12/867,581

(22) PCT Filed: Mar. 31, 2009

(86) PCT No.: PCT/US2009/038889
§ 371 (c)(1),
(2), (4) Date: Aug. 13, 2010

(87) PCT Pub. No.: WO2009/124009
PCT Pub. Date: Oct. 8, 2009

(65) Prior Publication Data
US 2010/0319791 A1    Dec. 23, 2010

Related U.S. Application Data

(60) Provisional application No. 61/040,733, filed on Mar. 31, 2008.

(51) Int. Cl.
*F14D 19/08*    (2006.01)

(52) U.S. Cl.
USPC .............................. 137/197; 137/558; 60/453

(58) Field of Classification Search .................. 137/197, 137/199, 557–559, 455, 2; 92/79; 454/71, 454/76; 244/35 R, 118.5; 60/453, 484; 116/202, 116/227, 276; 73/323, 293; 362/96, 802, 362/276; 250/577, 903; 340/870.29
See application file for complete search history.

(56) References Cited

U.S. PATENT DOCUMENTS

| | | | |
|---|---|---|---|
| 3,848,411 A | | 11/1974 | Strawn |
| 3,851,181 A | * | 11/1974 | Heule ............................ 250/577 |
| 3,935,876 A | * | 2/1976 | Massie et al. .................. 250/573 |
| 4,201,056 A | | 5/1980 | De Martelaere et al. |
| 4,327,362 A | * | 4/1982 | Hoss ........................ 340/870.02 |
| 4,448,458 A | | 5/1984 | Knothe et al. |
| 4,471,355 A | * | 9/1984 | Hardy et al. ............. 340/870.29 |
| 4,594,533 A | * | 6/1986 | Snook et al. .................. 250/576 |

(Continued)

FOREIGN PATENT DOCUMENTS

| | | |
|---|---|---|
| CA | 2483359 A1 | 10/2004 |
| EP | 0286391 A2 | 10/1988 |
| EP | 0961061 A1 | 12/1999 |
| WO | 2005/100064 A1 | 10/2005 |

*Primary Examiner* — Craig Schneider
*Assistant Examiner* — Craig J Price
(74) *Attorney, Agent, or Firm* — Thomas G. Fistek; Robert J. Clark

(57) ABSTRACT

An auto bleed valve and method of bleeding a hydraulic system of an aircraft is accomplished by illuminating a plenum of a bleed valve using an LED oriented to illuminate a phototransistor when air is present in the plenum. A comparator circuit is used on an output of the phototransistor such that a predetermined voltage output corresponds to air detected in the plenum. An integrating circuit and a second comparator in series with the first comparator circuit is used to determine when a predetermined time period is met in which air is continuously detected in the plenum. Thereafter an air bleed solenoid can be used to vent the air upon a signal from the aircraft computer logic system.

17 Claims, 2 Drawing Sheets

U.S. PATENT DOCUMENTS

| | | | |
|---|---|---|---|
| 4,642,984 A | 2/1987 | Dixen | |
| 4,664,155 A * | 5/1987 | Archung et al. | 137/877 |
| 4,720,636 A * | 1/1988 | Benner, Jr. | 250/573 |
| 4,869,596 A | 9/1989 | Klein et al. | |
| 5,036,661 A | 8/1991 | Gris | |
| 5,048,292 A | 9/1991 | Kubik | |
| 5,201,573 A | 4/1993 | Leiber et al. | |
| 5,225,669 A | 7/1993 | Hasch et al. | |
| 5,313,778 A | 5/1994 | Sweet et al. | |
| 5,324,101 A | 6/1994 | Kehl et al. | |
| 5,438,420 A * | 8/1995 | Harwick et al. | 356/440 |
| 5,497,864 A | 3/1996 | Oien | |
| 5,619,333 A | 4/1997 | Staff et al. | |
| 5,641,003 A | 6/1997 | Rey et al. | |
| 5,680,108 A * | 10/1997 | Daniell et al. | 250/573 |
| 5,687,566 A | 11/1997 | Petty | |
| 5,864,140 A | 1/1999 | Owens | |
| 5,964,326 A | 10/1999 | Lee et al. | |
| 6,047,720 A | 4/2000 | Stein | |
| 6,179,392 B1 | 1/2001 | Baechle et al. | |
| 6,237,617 B1 | 5/2001 | Sturman et al. | |
| 6,578,932 B2 | 6/2003 | Sakata | |
| 6,756,906 B2 * | 6/2004 | Bernal et al. | 250/574 |
| 6,942,075 B2 | 9/2005 | Buckley et al. | |
| 6,982,431 B2 * | 1/2006 | Modlin et al. | 250/573 |
| 7,013,642 B2 | 3/2006 | Smith | |
| 7,306,008 B2 * | 12/2007 | Tornay | 137/558 |
| 7,344,206 B2 | 3/2008 | Schmidt | |

\* cited by examiner

AUTOMOTIVE AIR BLEED VALVE FOR A CLOSED HYDRAULIC SYSTEM

CROSS-REFERENCE TO RELATED CASES

This application claims the benefit of U.S. Provisional Application Ser. No. 61/040,733; filed Mar. 31, 2008, the disclosure of which is expressly incorporated herein by reference.

TECHNICAL FIELD

The present invention relates, in general, to an air bleed valve, and in particular to electronics that actuates or does not actuate the air vent solenoid of the auto bleed valve based on illumination of a plenum of the valve and the sensed state of the phototransistor over a predetermined period of time.

BACKGROUND

A problem with auto bleed valves involves transient bubbles in the system. Transient bubbles can pass through the plenum chamber and when sensed, cause the air vent solenoid relay to activate on and off rapidly in response to those bubbles being sensed. This can lead to unhelpful brief relay and valve actuations that would shorten life and lessen reliability.

SUMMARY

At least one embodiment of the invention provides an automatic bleed valve comprising: a plenum chamber; an air detection system comprising an LED and a photoelectric diode, the LED configured to illuminate the photoelectric diode when air is detected in the plenum chamber; a first comparator circuit which takes in the output voltage of the photoelectric diode, the first comparator circuit provides a generally constant output voltage when the output voltage of the photoelectric diode corresponds to a voltage signaling that air is detected in the plenum chamber; an integrator circuit in series with the first comparator circuit, the integrator circuit providing an output voltage to a second comparator circuit which takes in an output of the integrator circuit; and a vent solenoid which can be actuated to bleed gas from the valve when a predetermined threshold voltage of the second comparator circuit is met by the output voltage of the integrator circuit.

At least one embodiment of the invention provides an automatic bleed valve comprising: a plenum chamber; a sensor for determining if air is present in the plenum chamber; a first analog comparator circuit which takes in an output voltage of the sensor, the first comparator circuit provides a generally constant output voltage when the output voltage of the sensor corresponds to a voltage signaling that air is detected in the plenum chamber; an analog integrator circuit in series with the first comparator circuit, the integrator circuit providing an output voltage to a second analog comparator circuit which takes in an output of the integrator circuit; and a vent solenoid which can be actuated to bleed gas from the valve when a predetermined threshold voltage of the second comparator circuit is met by the output voltage of the integrator circuit.

At least one embodiment of the invention provides a method of bleeding a hydraulic system of an aircraft comprising the steps of: illuminating a plenum of a bleed valve using an LED oriented to illuminate a phototransistor when air is present in the plenum; using a comparator circuit on an output of the phototransistor such that a predetermined voltage output corresponds to air detected in the plenum; determining whether a predetermined time period is met in which air is continuously detected in the plenum using an integrating circuit and a second comparator in series with the first comparator circuit; actuating an air bleed solenoid after the predetermined time period is reached.

At least one embodiment of the invention provides a method of bleeding a hydraulic system of an aircraft comprising the steps of: illuminating a plenum of a bleed valve; using a phototransistor to sense the illuminated plenum and provide a corresponding output to a first comparator circuit corresponding to a gas present condition; using an integrating circuit to provide an output to a second comparator; sending a signal to the aircraft flight computer when the second comparator is actuated; bleeding the valve by actuating the solenoid on command from the aircraft flight computer.

BRIEF DESCRIPTION OF THE DRAWINGS

Embodiments of this invention will now be described in further detail with reference to the accompanying drawing, in which.

DETAILED DESCRIPTION OF THE DRAWINGS

Figure 1:
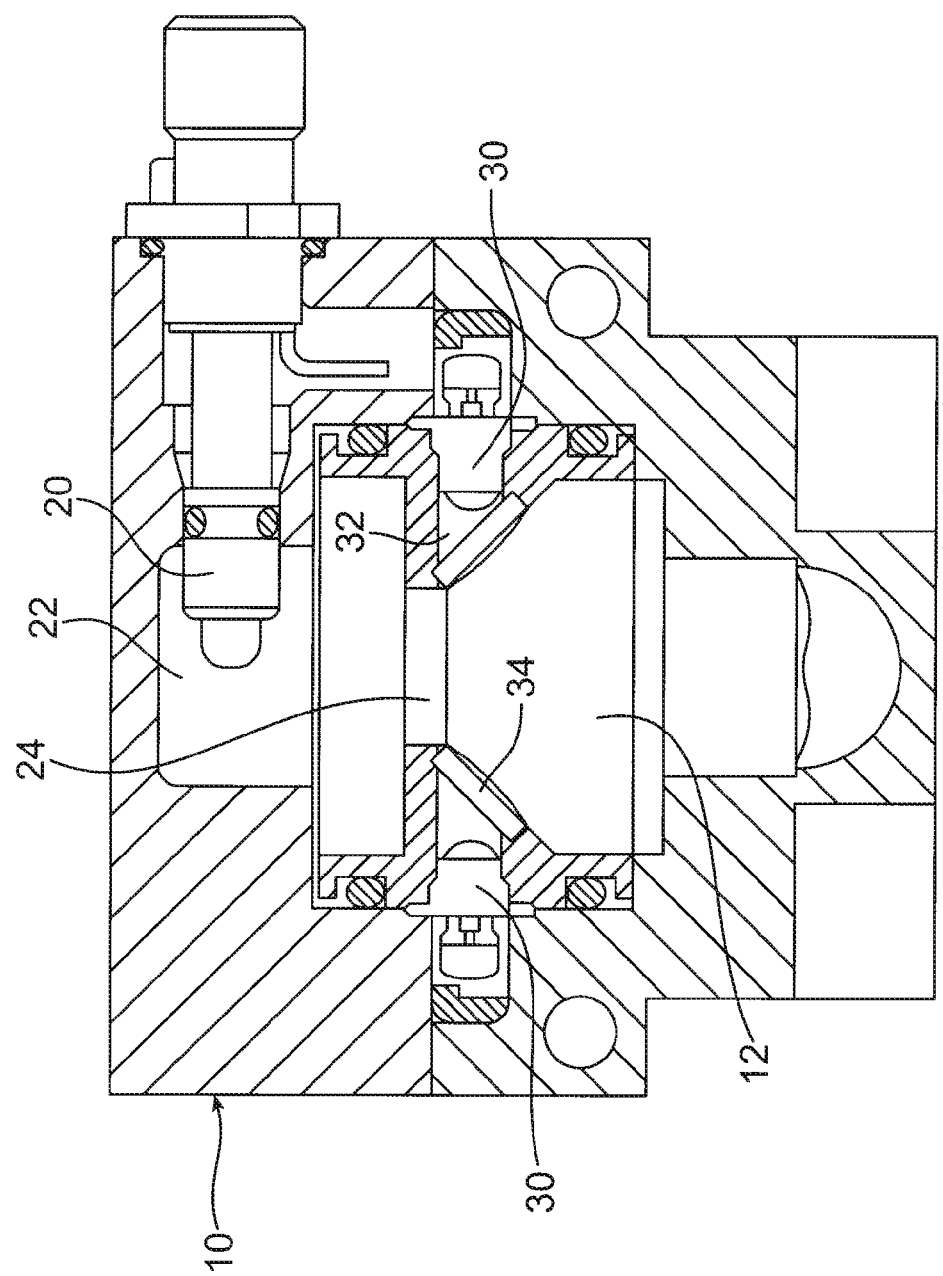
FIG. 1 is a cross-sectional view of an embodiment of the auto bleed valve of the present invention.

Referring to FIG. 1, a cross-sectional view of an embodiment of an auto bleed valve 10 is shown. The auto bleed valve 10 comprises a plenum chamber 12 that is situated at the high point of a hydraulic reservoir system (not shown), so that any entrapped gases in the hydraulic system can rise and collect in the auto bleed valve plenum chamber 12. Inside the plenum 12 there is an air/oil detector system comprising a phototransistor (PT) 20 sensitive to a given band of light, and a light emitting diode (LED) 30 which, when energized emits that band of light. The PT 20 and the LED 30 are each in an air filled chamber 22, 32, respectively, behind a transparent window 24, 34, that is canted at an appropriate angle from the light beam, the angles being symmetric about the plenum centerline. The transparent windows 24, 34 separate the air filled LED and PT chambers 22, 32 from the plenum chamber 12 that may contain air or oil. The LED emission axis, and the PT sensitivity axis are pointed at each other, so that the LED 30 would illuminate the PT 20 through the canted windows 34.

If the index of refraction of the material between the canted windows is nearly the same as the index of refraction of the air between the canted window and the PT 20 and LED 30, then the direction of transmission of light is not changed from the LED and PT. In that case the LED 30, when on, will illuminate the PT 20 causing it to drop its current resistance, a condition that can be sensed with relatively simple electronics. If the index of refraction of the material (i.e., liquid) between the canted windows is higher than the index of refraction of the air between the canted windows and the PT 20 and LED 30, then the direction of transmission of light is changed so that the light from the LED 30 cannot be transmitted to the PT 20, and the resistance of the PT 20 remains high. Therefore, this arrangement allows discrimination between cases when air or oil occupies the volume between the canted windows.

Figure 2:
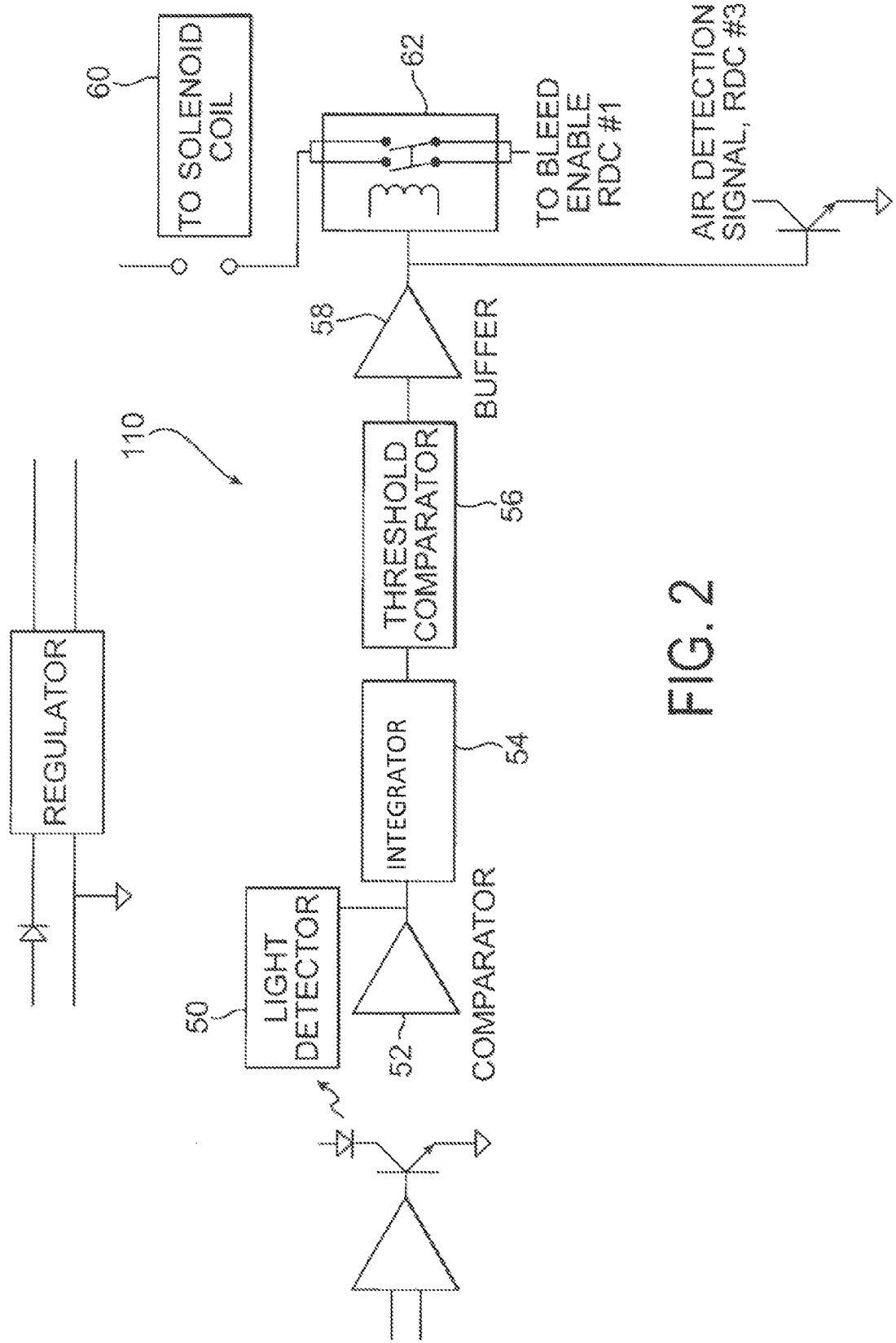
FIG. 2 is a functional block diagram of the auto bleed valve circuit in accordance with an embodiment of the present invention.

Referring now to FIG. 2, the electrical schematic of the auto bleed valve is shown. The schematic of the auto bleed circuit 110 comprises a light detector 50 which senses the state of the PT when the LED is illuminated. The output of the light detector 50 is sent to a comparator circuit 52 which determines if there is gas in the plenum 12 of the auto bleed valve 10. The comparator circuit output goes to one of its two possible states depending upon whether the input voltage is greater than or less than a predetermined voltage threshold—in this case a voltage at a level indicating gas in the plenum. The output of the comparator circuit 52 is sent to an integrator circuit 54 which delays actuation of the solenoid until the comparator circuit 52 has indicated that gas is present in the plenum 12 for a predetermined period of time. (An integrator circuit produces a steadily changing output voltage for a constant input voltage). The output of the integration circuit 54 is routed through a second comparator 56 or threshold comparator in order to set the length of time that must pass prior to actuating the solenoid 60. When the integrator output voltage 54 reaches a preset level, the second comparator output jumps from no current to full current to actuate the solenoid 60 and send a "gas present" signal to the aircraft interface circuit. The threshold voltage of the second comparator circuit is adjustable to provide a larger or smaller time delay for determining if air is present in the plenum. The comparator and integrator circuits used are relatively simple, completely analog, can readily be implemented with components rated for the environment, and require no software programming. Nonetheless the auto bleed valve implementation provides for close coordination with other aircraft functions with a high reliability, and provides the means for trouble diagnosis.

In order to ensure reliability, the auto bleed circuit 110 works in conjunction with aircraft logic. The voltage output from the second comparator 56 is sent to a buffer 58. The power to the solenoid valve 60 is interrupted through an aircraft relay that must be closed before the auto bleed valve relay 62 and the solenoid valve 60 can be energized. Thereby, the aircraft must first command a venting operation through the aircraft logic. The auto bleed valve sense circuit 110 signals the aircraft that air is present in the plenum, so that the aircraft logic can respond and vent the air at an appropriate time, based on other parameters.

Further, within the auto bleed valve circuit 110, independent of aircraft logic, the auto bleed valve relay 62 can only be energized when the auto bleed circuit 110 senses that air is present. When no air is present, the solenoid valve 60 is de-energized and closes. Consequently a venting operation will only occur when the aircraft logic call for it, and when the auto bleed valve senses air present to bleed. This gives control of the valve to the aircraft logic, but ensures that the aircraft interface cannot keep the valve open when bleeding is not appropriate.

This scheme also provides for the possibility auto bleed valve diagnostics within the aircraft logic. The aircraft computer can be programmed to sense that the auto bleed valve has been held open too long, indicating a problem with venting or the auto bleed sense circuit. The aircraft computer can also be programmed to sense that the auto bleed valve has not been actuated when it was expected, or for too long a time, prompting a maintenance action to determine if the gas sense circuit is working.

The present invention provides several advantages over prior art systems. The system of the present invention does not require on-board programmable logic, and thereby allows the use of off the shelf, commonplace analog components. The software that is used with the disclosed auto bleed valve is completely within the aircraft software suite that must exist in any case, and thereby avoids the need to qualify software for the valve itself. The relatively simple components and simple on-valve implementation enhances reliability over the dual channel system with built in tests, and programmable logic components. In addition, the fail safe requirement is accomplished through the implementation of the required redundant aircraft and valve vent commands. This eliminates the prospect of unwanted venting without the use of multiple sensors and sensor arbitration logic. The built in delay circuitry eliminates spurious venting and brief nuisance indications of gas in the plenum. The gas sense—vent interaction with the aircraft allows the flagging of potential failure modes within the aircraft logic.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention. Accordingly, the scope and content of the present invention are to be defined only by the terms of the appended claims.

What is claimed is:

1. An automatic bleed valve comprising:
   a plenum chamber;
   an air detection system comprising an LED and a photoelectric diode, the LED configured to illuminate the photoelectric diode when air is detected in the plenum chamber;
   a first comparator circuit which takes in the output voltage of the photoelectric diode, the first comparator circuit provides a generally constant output voltage when the output voltage of the photoelectric diode corresponds to a voltage signaling that air is detected in the plenum chamber;
   an integrator circuit in series with the first comparator circuit, the integrator circuit providing an output voltage to a second comparator circuit which takes in an output of the integrator circuit; and
   a vent solenoid which can be actuated to bleed gas from the valve when a predetermined threshold voltage of the second comparator circuit is met by the output voltage of the integrator circuit.

2. The bleed valve of claim 1 further comprising a buffer circuit which is activated when the second comparator receives the predetermined threshold voltage indicating that air is present in the plenum.

3. The bleed valve of claim 1 further comprising an auto bleed valve relay, which prevents actuation of the solenoid until a signal from an outside source is received.

4. The bleed valve of claim 3, wherein the signal from an outside source is provided by an aircraft control logic.

5. The automatic bleed valve of claim 1, wherein the valve utilizes a single phototransistor.

6. The automatic bleed valve of claim 1, wherein the first comparator circuit is completely analog.

7. The automatic bleed valve of claim 1, wherein the integrator circuit is completely analog.

8. The automatic bleed valve of claim 1, wherein the second comparator circuit is completely analog.

9. The automatic bleed valve of claim 1, wherein the threshold voltage of the second comparator circuit is adjustable to provide a larger or smaller time delay for determining if air is present in the plenum.

10. An automatic bleed valve comprising:
    a plenum chamber;

a sensor for determining if air is present in the plenum chamber;

a first analog comparator circuit which takes in an output voltage of the sensor, the first comparator circuit provides a generally constant output voltage when the output voltage of the sensor corresponds to a voltage signaling that air is detected in the plenum chamber;

an analog integrator circuit in series with the first comparator circuit, the integrator circuit providing an output voltage to a second analog comparator circuit which takes in an output of the integrator circuit;

a vent solenoid which can be actuated to bleed gas from the valve when a predetermined threshold voltage of the second comparator circuit is met by the output voltage of the integrator circuit.

11. The bleed valve of claim 10 further comprising a buffer circuit which is activated when the second comparator receives the predetermined threshold voltage indicating that air is present in the plenum.

12. The bleed valve of claim 10 further comprising an auto bleed valve relay, which prevents actuation of the solenoid until a signal from an outside source is received.

13. The bleed valve of claim 12, wherein the signal from an outside source is provided by an aircraft control logic.

14. The bleed valve of claim 10, wherein the sensor is a phototransistor and an LED configured such that the LED illuminates the phototransistor when air is present in the plenum.

15. A method of bleeding a hydraulic system of an aircraft comprising the steps of:

illuminating a plenum of a bleed valve using an LED oriented to illuminate a phototransistor when air is present in the plenum;

using a comparator circuit on an output of the phototransistor such that a predetermined voltage output corresponds to air detected in the plenum;

determining whether a predetermined time period is met in which air is continuously detected in the plenum using an integrating circuit and a second comparator in series with the first comparator circuit;

actuating an air bleed solenoid after the predetermined time period is reached.

16. The method of claim 15, further comprising the step of sending a signal to an aircraft flight computer that air is present in the plenum.

17. The method of claim 16, wherein the air bleed solenoid is only actuated on command from the aircraft flight computer.

* * * * *